United States Patent
Sauder et al.

(10) Patent No.: US 7,811,219 B2
(45) Date of Patent: Oct. 12, 2010

(54) METHOD AND APPARATUS FOR MAKING BAGS

(75) Inventors: Charles H. Sauder, Appleton, WI (US); Paul A. Johnson, Menasha, WI (US); Christopher L. Schlies, Greenleaf, WI (US)

(73) Assignee: CMD Corporation, Appleton, WI (US)

( * ) Notice: Subject to any disclaimer, the term of this patent is extended or adjusted under 35 U.S.C. 154(b) by 0 days.

(21) Appl. No.: 12/190,095

(22) Filed: Aug. 12, 2008

(65) Prior Publication Data

US 2008/0300122 A1    Dec. 4, 2008

Related U.S. Application Data

(63) Continuation of application No. 11/424,834, filed on Jun. 16, 2006, now abandoned.

(51) Int. Cl.
*B31B 1/00* (2006.01)
*B31B 49/00* (2006.01)

(52) U.S. Cl. .............. 493/11; 493/13; 493/17; 493/22; 493/34

(58) Field of Classification Search ............ 493/11, 493/13, 14, 17, 18, 22, 34
See application file for complete search history.

(56) References Cited

U.S. PATENT DOCUMENTS

| | | | |
|---|---|---|---|
| 4,578,052 A | 3/1986 | Engel et al. | |
| 4,618,391 A * | 10/1986 | Torti et al. | 156/353 |
| 4,642,084 A | 2/1987 | Geitman, Jr. | |
| 4,934,993 A | 6/1990 | Geitman, Jr. | |
| 5,292,299 A | 3/1994 | Anderson et al. | |
| 5,447,486 A | 9/1995 | Anderson et al. | |
| 5,518,559 A | 5/1996 | Saindon et al. | |
| 5,587,032 A | 12/1996 | Saindon et al. | |
| 5,660,674 A | 8/1997 | Saindon et al. | |
| 5,701,180 A | 12/1997 | Saindon et al. | |
| 5,861,078 A | 1/1999 | Huben et al. | |
| 6,117,058 A | 9/2000 | Sauder et al. | |
| 6,454,689 B1 * | 9/2002 | Voss | 493/11 |
| 6,717,087 B1 * | 4/2004 | Wecke et al. | 209/579 |
| 6,792,807 B2 | 9/2004 | Binder et al. | |
| 7,222,472 B2 | 5/2007 | Spatafora et al. | |
| 7,406,809 B2 | 8/2008 | Spatafora et al. | |
| 2004/0029693 A1 * | 2/2004 | Spatafora et al. | 493/19 |
| 2006/0133701 A1 | 6/2006 | Daniels | |

FOREIGN PATENT DOCUMENTS

EP          0 842 765       11/1997

* cited by examiner

*Primary Examiner*—Hemant M Desai
(74) *Attorney, Agent, or Firm*—George R. Corrigan

(57) ABSTRACT

A method and apparatus for making bags is disclosed. It includes receiving a film and imparting a plurality of successive seals to the film to form bags. The location of the imparted seals is determined by monitoring at least two sensors. A plurality of perforations are imparted to the film at locations relative to a corresponding seal in response to the determination. The position of a perforator such as rotary position, of a knife may be controlled in response to determining the location. The seals may be formed by a rotary drum, and the perforation by a rotary knife. The sensors may be at the same or different cross machine direction and/or machine direction locations. Startup may include adjusting and recording the position of a prior perforation relative to a prior corresponding seal, and using that recording as a base relative location in another embodiment.

22 Claims, 3 Drawing Sheets

METHOD AND APPARATUS FOR MAKING BAGS

RELATED APPLICATIONS

This is a continuation of, and claims the benefit of the filing date of, U.S. patent application Ser. No. 11/424,834, filed on Jun. 16, 2006, now abandoned entitled Method and Apparatus for Making bags.

FIELD OF THE INVENTION

The present invention relates generally to the art of bag making. More specifically, it relates to making bags from a film by imparting seals thereto.

BACKGROUND OF THE INVENTION

There are many known bag machines. One style is a rotary drum machine. Rotary drum machines are well known, and found in U.S. Pat. Nos. 6,117,058, 4,934,993, 5,518,559, 5,587,032 and 4,642,084 (each of which is hereby incorporated by reference). Bag machine, as used herein, includes a machine used to make bags such as draw tape bags, non-draw tape bags, and other bags.

A detailed description of the operation of rotary bag machines may be found in the patents above, or in prior art commercially available machines such as the CMD 1270GDS or 1552ED, but their general operation may be seen with respect to FIG. 1. A prior art rotary bag machine 100 continuously processes a web 201 using an infeed section 203, a sealing section 210, and a perforation section 118. An output section may be included. The web is provided through infeed section 203, to sealing section 210, and then to perforation section 118. A controller 121 controls the servo motors (or other motors) that control where seals and perforations are made.

Infeed section, as used herein, includes a section that receives film from a roll, and may be simply a nip, or other components such as dancers, etc. Perforation section, as used herein, includes a section that applies a perforation to a film, and may include rotary knives. Sealing section, as used herein, includes a section that applies one or more seals to a film to form bags, and may include a rotary drum. Output section, as used herein, includes processing stations that act on a web downstream of the seals being formed, such as winders, folders, etc. Processing station, as used herein, includes any device that operates on the film, such as sealing, folding, perforating, winding, etc.

Sealing section 210, including drum 208, impart a plurality of successive seals to form bags (one or more seals may be used to form each bag). Plurality of successive seals, as used herein, includes more than one seal or group of seals that form a bag.

The prior art of FIG. 1 provides that after web 201 leaves drum 208 (in sealing section 210) it is directed to a rotary knife (part of perforation section 118), which creates a perforation between bags, or could separate adjoining bags. When the bags are end to end bags, the perforation is placed close to the single seal such that when the bags are separated, the perforation and the perforated end are the top of one bag, and the seal is the bottom of the adjoining bag. Ideally, the perforation is close to the seal to reduce waste, although this is difficult in practice. The distance between the seal and the perforation is called the skirt length.

When bags are formed side to side, the perforation is made between the pair of seals. Thus, there are skirt lengths on either side of the perforation. A seal is needed on both sides of the perforation, since the side of both bags should be sealed. The web between the pair of seals is wasted. Thus, the pair of seals should be close to one another to reduce waste, although this requires the perforation to be precisely located, which is difficult in practice. For example, variation due to tension, film gauge variation, machine variations etc., occasionally causes seals to get cut off, or the distance between a seal and perforation to be too great.

Controller 121 is connected to the various components to control speed, position, etc. Controller, as used herein, includes digital or analog components, and related software, inputs and outputs, located together or separately, that cooperates to control one or more portions of a machine.

Sensors have been used to detect seals prior to the formation of the perforation to help form the perforation in the correct location. Sensor, as used herein, includes sensors that sense seals, burn marks, holes, ink marks, etc. Sensing the seal has proven to be difficult. One prior art example of a system that sensed seals is described in U.S. Pat. No. 6,792,807, hereby incorporated by reference. Another prior art patent, U.S. Pat. No. 5,447,486 uses printed marks or marks created by the seal bar to sense the location of the seal to try and register the perforation to the registration. If the perforation is placed too close to one side seal, then the seal may be cut off, rendering the bag useless. Other systems that attempt to control the skirt length are described in U.S. Pat. Nos. 5,660,674 and 5,701,180. However, the prior art methods often provide false positives or miss the seals. The prior art located the sensors at various locations, including near the drum, or near the knife, but provided a single sensor.

Accordingly, a method and machine for making bags that provides for accurate detection of seals are desired.

SUMMARY OF THE PRESENT INVENTION

According to a first aspect of the invention a method of making bags includes receiving a film and imparting a plurality of successive seals to the film to form bags. The location of the imparted seals is determined by monitoring at least two sensors. A plurality of perforations are imparted to the film at locations relative to a corresponding seal in response to the determination.

According to a second aspect of the invention an apparatus for making bags from a film that travels through the apparatus in a machine direction, from upstream to downstream, includes an infeed section, a sealing section located downstream of the infeed section, a seal sensing station located downstream of the sealing station, a perforation section located downstream of the sealing section, and a controller. The seal sensing station includes first and second sensors. The controller is connected to the seal sensing station and the perforation section, wherein the controller controls the location of a plurality of perforations with respect to corresponding seals, in response to the seal sensing station.

Imparting a perforation includes controlling a position of a perforator, and/or adjusting the position, such as rotary position, of a knife in response to determining according to various alternatives.

Imparting a plurality of seals includes rotating a drum according to another alternative.

The sensors are at different cross machine direction and/or machine direction locations in various embodiments.

The determination is ignored if the second sensor does not detect the seal after the first sensor detects the seal, and/or if the error does not exceed a threshold in various embodiments.

Ignoring can include not changing the location of a subsequent perforation relative to a subsequent corresponding seal.

The adjustment does not exceed a maximum adjustment, regardless of the error in another embodiment.

Startup includes adjusting and recording the position of a prior perforation relative to a prior corresponding seal, and using that recording as a base relative location in another embodiment.

Other principal features and advantages of the invention will become apparent to those skilled in the art upon review of the following drawings, the detailed description and the appended claims.

Figure 1:
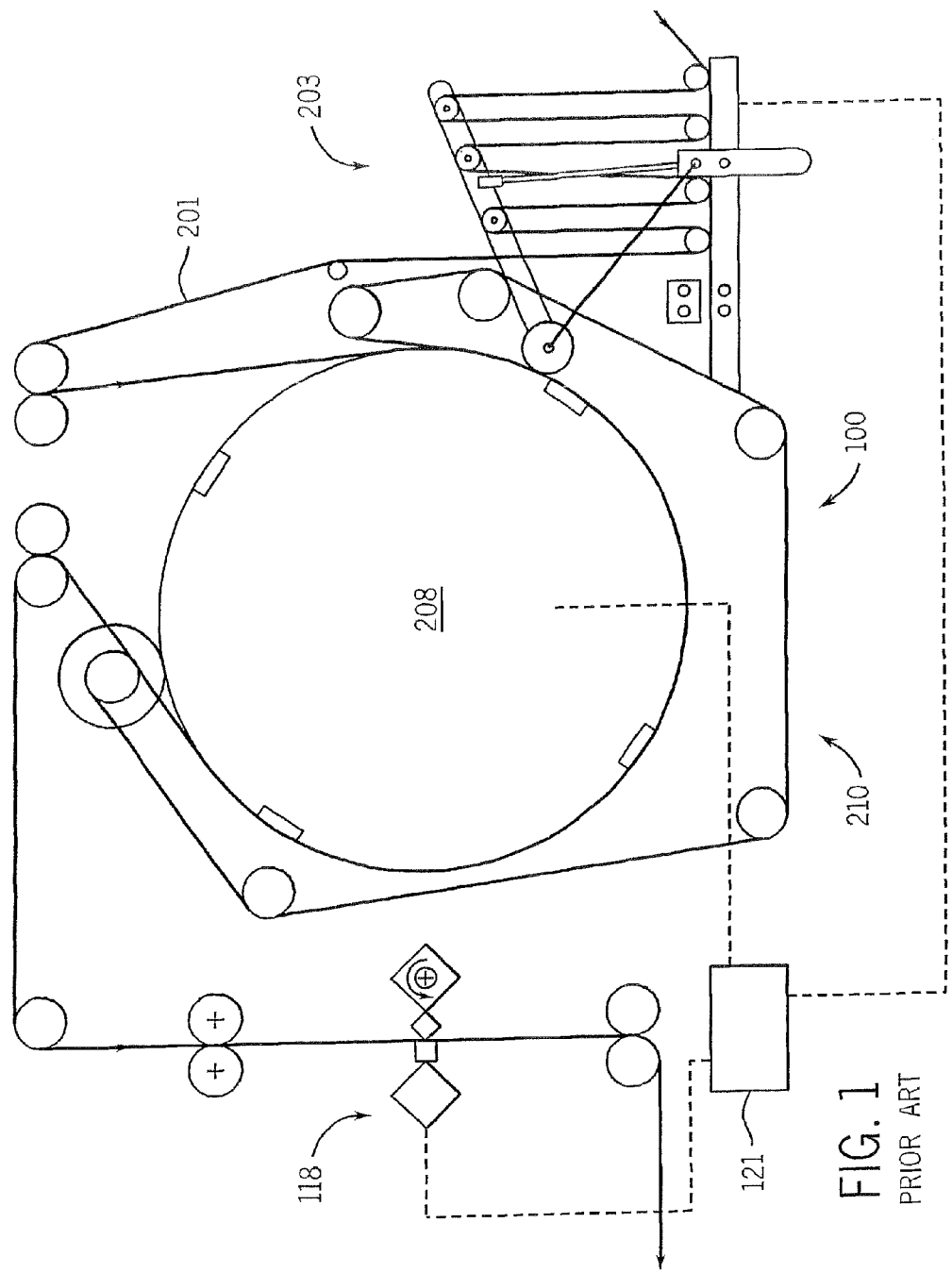
FIG. 1 is a diagram of a prior art bag machine.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a rotary drum machine, with particular components and a particular control scheme, it should be understood at the outset that the invention can also be implemented with other types of machines, and/or using other components and control schemes.

Generally, the present invention can be implemented with a prior art machine, but includes a plurality of sensors, preferably two, to detect the seal or a seal mark. In response to that detection, the location of the perforation relative to the corresponding seal is controlled. Because multiple sensors are used, the system is more accurate, and less prone to miss seals. The sensors may be any sensors, such as a spark gap, visual, thermal, acoustic, mechanical, etc.

Corresponding seal, as used herein, includes the seal that, along with a perforation denotes adjacent bags. Location relative to a corresponding seal, as used herein, refers to the skirt length, or distance between a seal and a perforation that denote adjacent bags.

Generally, the skirt length is controlled by having the user initially manually adjust an initial skirt length. A controller records the knife position when the seal is sensed for the skirt length. The desired knife position when the seal is sensed is called the base relative location. The machine then enters an active registration mode, either automatically or at the users request.

Active registration means the sensors and the controller detects the seal location and then note the knife position. The position of the knife is adjusted in response to the detected seal, actual knife location and the base relative location determined during start-up. The start-up is automatic in another embodiment, where the controller causes the knife to advance for each bag until the desired skirt length (user or factory set) is reached.

Adjusting and recording the position of a prior perforation relative to a prior corresponding seal, as used herein, includes the setting of a skirt length to a desired length, and then recording the skirt length, or relative knife position. Base relative location, as used herein, includes the desired skirt length set by the user (or automatically set) at start up. Adjusting a location of a knife, as used herein, includes adjusting the rotary or linear position of a knife, which results in adjust the location of the perforation the knife creates. The location can be expressed as a distance, time (for a given speed), encoder pulses, rotary position, etc. Determining the location of the imparted seals, as used herein, includes sensing either seal or a mark that indicates the presence of a seal, such as a burn mark, ink mark, etc with respect to a reference such as a timer, encoder, resolver, etc.

Figure 2:
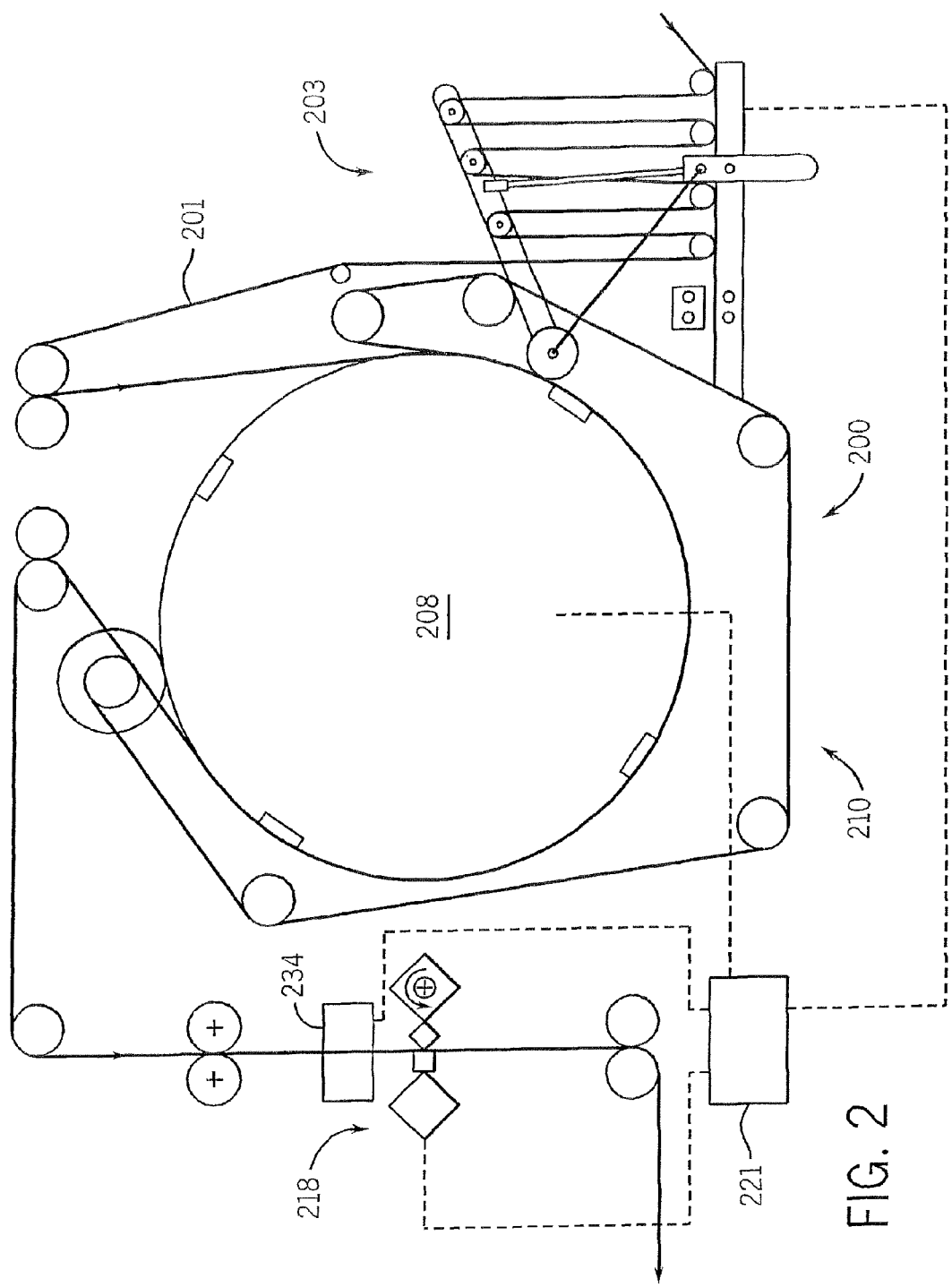
FIG. 2 is a diagram of a nag machine in accordance with the preferred embodiment.

FIG. 2 shows a bag machine 200 in accordance with the present invention. It may be similar to the prior art and includes an infeed section 203, a sealing section 210, and a perforation section 218. An output section may be included. A sensing station 234 includes at least two sensors. Controller 221 receives signals from sensing station 234.

Figure 4:
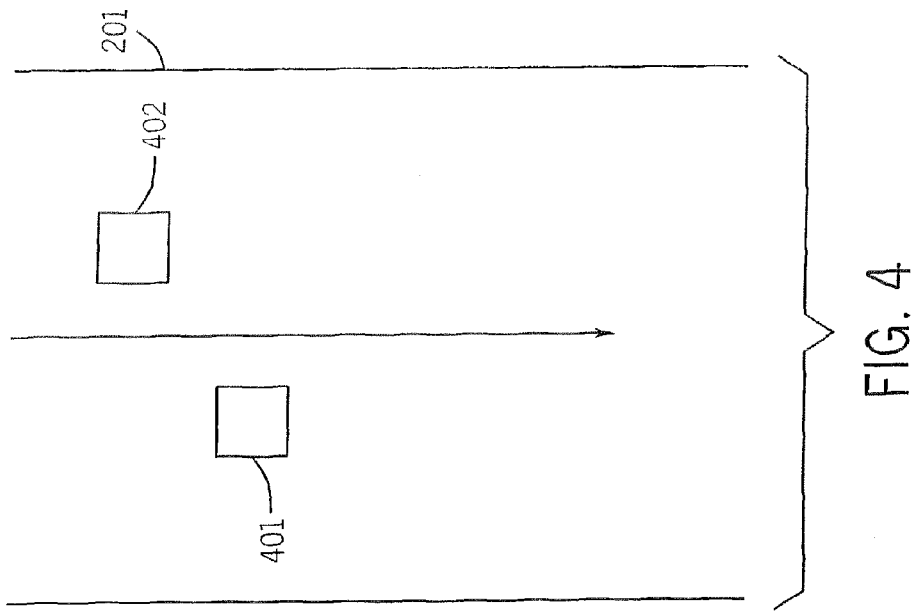
FIG. 4 is a diagram of a pair of sensors in accordance with the preferred embodiment.
Figure 3:
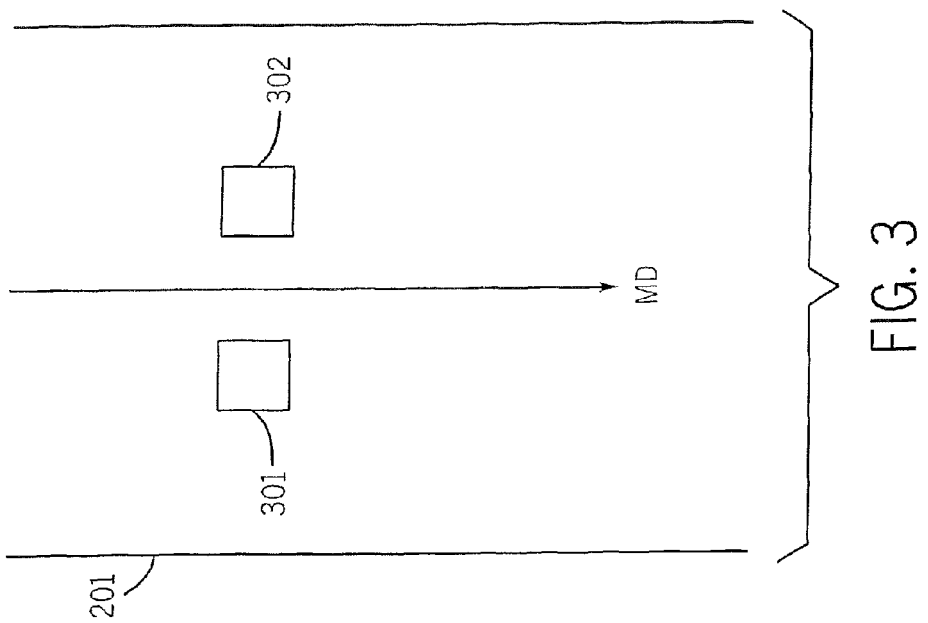
FIG. 3 is a diagram of a pair of sensors in accordance with the preferred embodiment.

The at least two sensors are preferably disposed to sense different pixels of the film—i.e., in different cross machine locations, as shown by the location of sensors 301 and 302 in FIG. 3, and sensors 401 and 402 in FIG. 4. They can be located at the same or different machine direction locations. Alternatives provide for the same cross machine location. Different cross machine direction locations, as used herein, refers to locations that are offset in the cross machine direction, and may or may not be offset in the machine direction. Different machine direction locations, as used herein, refers to locations that are offset in the machine direction, and may or may not be offset in the cross machine direction.

The preferred embodiment uses a machine direction offset between the sensors, and controller 221 rejects bad data, such as when sensor 401 detects the seal prior to sensor 402 detecting the seal, or the difference between the triggering of the two sensors is too much or too little. In the event of such a "bad read", the knife is preferable controlled to be in the same location (based on encoder pulses, e.g.,) as for the prior perforation.

When the sensors are triggered in the proper order and with the correct difference therebetween (indicating a "good read"), an error is calculated, which is the difference between the actual knife location and the desired location (base relative location) determined during start-up. If the error is less than a threshold, controller 221 does not adjust the knife's relative position. If the error is greater than the threshold (which is zero in various embodiments) the knife's relative position or location is adjusted in response to the error, for example by adding or subtracting to encoder pulses, or commanding a new rotary location.

If three bad reads (where the data is ignored) in a row are experienced, controller 221 preferably determines the sensors are sensing something other than the target (seal, mark etc.), and alerts the user.

Controller 221 also provides for a maximum adjustment, regardless of the error. Maximum adjustment, as used herein, indicates that a greater adjustment is not made, even when the error is greater. A start up module for the user to manually set the initial skirt length is preferably included, and can include a user input to adjust the relative knife location (such as a push button, dial, etc.)

If the error is less than the maximum, but greater than the threshold, the knife position is corrected by the amount of the error (i.e., a gain of one). This maintains the skirt length at the desired length.

The preferred control scheme uses the start-up sequence described above. The user manually adjusts the perforation location until it is in its desired location. Then the controller denotes the knife position, set by encoder pulses or by the resolver, relative to the seal detection. This is the base relative location, and is stored by the controller. During active registration the controller monitors the seal sensors. When the seal sensors detect a seal, the controller screens the data to make sure the read is a good read. The screening can be done based on encoder pulses of either the main drive, the knife, or any other timing mechanism. Given the nominal speed of the web, the time is indicative of distance. The position of the knife is determined at the time of the good read (by pulses or the resolver), and the controller determines the error between the actual position and the base relative location (the desired position). Again, the error can be in time, encoder pulses or resolver position, and can be translated to distance by knowing the linear speed of the knife and/or the web, or the circumference of the knife's orbit. If the error is greater than a threshold, the controller then adjusts the position of the knife to compensate for the error. The controller limits the adjustment to the maximum, regardless of the error. The sensors are preferably close to the knife so that there is little variation of the distance the film actually travels from the sensed seal location to the knife (by fluttering of the film, e.g.).

Alternatives provide for sensing multiple seals and averaging, using a gain of more or less than one, using other control schemes, using more sensors, using other knives or drums, or systems, provides the sensors after the knife for closed loop feedback, placing the sensors closer to the drum, and/or using the drum encoder to position the knife (rather than the knife encoder).

Numerous modifications may be made to the present invention which still fall within the intended scope hereof. Thus, it should be apparent that there has been provided in accordance with the present invention a method and apparatus for making bags that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of making bags, comprising:
   receiving a film;
   imparting a plurality of successive seals to the film to form bags thereon;
   determining the location of the imparted seals, by monitoring at least a first sensor that provides a first signal indicative of the location of the imparted seals and a second sensor that provides a second signal indicative of the location of the imparted seals; and
   imparting a plurality of perforations to the film at locations relative to a corresponding seal in response to determining.

2. The method of claim 1, wherein imparting a perforation includes controlling a position of a perforator in response to determining.

3. The method of claim 2, wherein imparting a plurality of seals includes rotating a drum.

4. The method of claim 3, wherein the film is moved in a machine direction from the drum to the first sensor, and further comprising positioning the first sensor and positioning the second sensor at different machine direction locations.

5. The method of claim 4, wherein the film is moved in the machine direction from the first to the second sensor, and further comprising ignoring the determining if the second sensor does not detect the seal after the first sensor detects the seal.

6. The method of claim 5, wherein ignoring further includes not changing the location of a subsequent perforation relative to a subsequent corresponding seal.

7. The method of claim 4, wherein the film is moved in the machine direction from the first to the second sensor, and further comprising ignoring the determining if the second sensor does not detect the seal more than a threshold after the first sensor detects the seal.

8. The method of claim 3, wherein imparting includes adjusting a location of a knife in response to the determining.

9. The method of claim 8, wherein adjusting includes making an adjustment no more than a maximum adjustment.

10. The method of claim 9, further comprising starting the method by adjusting and recording the position of a prior perforation relative to a prior corresponding seal, and using that recording as a base relative location.

11. The method of claim 1, wherein the film is moved in a machine direction from the drum to the first sensor, and further comprising positioning the first sensor and positioning the second sensor at different cross machine direction locations.

12. An apparatus for making bags from a film, wherein the film travels through the apparatus in a machine direction, from upstream to downstream, comprising:
   an infeed section;
   a sealing section, located downstream of the infeed section;
   a seal sensing station, including a first sensor located downstream of the sealing station that provides a first signal indicative of a seal location and a second sensor located downstream of the sealing station that provides a second signal indicative of the seal location, that sense the same seals;
   a perforation section located downstream of the sealing section; and
   a controller, connected to the seal sensing station and the perforation section, wherein the controller controls the location of a plurality of perforations with respect to corresponding seals, in response to the seal sensing station.

13. The apparatus of claim 12, wherein the sealing section includes a rotary drum.

14. The apparatus of claim 13, wherein the first and second sensors are at different machine direction locations.

15. The apparatus of claim 12, wherein the first and second sensors are at different cross machine direction locations.

16. The apparatus of claim 12, wherein the perforating station includes a knife.

17. The apparatus of claim 12, further comprising a manual skirt adjustment, and wherein the controller is responsive to the manual skirt adjustment.

18. An apparatus of making bags, comprising:
   means for receiving a film;
   means for imparting a plurality of successive seals to the film to form bags thereon, disposed to receive the film from the means for receiving;

first means for determining the location of the imparted seals and providing a first signal indicative thereof, disposed to receive the film from the means for imparting a plurality of seals;

second means for determining the location of the imparted seals and providing a second signal indicative thereof, disposed to receive the film from the means for imparting a plurality of seals; and means for imparting a plurality of perforations to the film at locations relative to a corresponding seal in response to the first and second means for determining.

19. The apparatus of claim 18, wherein the first and second means for determining the location of the imparted seals at different machine direction locations.

20. The apparatus of claim 19, wherein the first and second means for determining are at different cross machine direction locations.

21. The apparatus of claim 19, further comprising means for ignoring the first and second means for determining if the second means for determining does not detect the seal after the first means for determining detects the seal.

22. The apparatus of claim 21, further comprising means for recording a user set starting position of a prior perforation relative to a prior corresponding seal, and means for using that recording as a base relative location.

* * * * *